United States Patent
Birru

(10) Patent No.: US 8,233,576 B2
(45) Date of Patent: Jul. 31, 2012

(54) SYSTEM, APPARATUS, AND METHOD FOR A ROBUST SYNCHRONIZATION SCHEME FOR DIGITAL COMMUNICATION SYSTEMS

(75) Inventor: Dagnachew Birru, Yorktown Heights, NY (US)

(73) Assignee: Koninklijke Philips Electronics N.V., Eindhoven (NL)

(*) Notice: Subject to any disclaimer, the term of this patent is extended or adjusted under 35 U.S.C. 154(b) by 686 days.

(21) Appl. No.: 12/096,622

(22) PCT Filed: Dec. 5, 2006

(86) PCT No.: PCT/IB2006/054614
§ 371 (c)(1),
(2), (4) Date: Jun. 9, 2008

(87) PCT Pub. No.: WO2007/066292
PCT Pub. Date: Jun. 14, 2007

(65) Prior Publication Data
US 2008/0304607 A1      Dec. 11, 2008

Related U.S. Application Data

(60) Provisional application No. 60/748,675, filed on Dec. 8, 2005.

(51) Int. Cl.
*H04L 7/02* (2006.01)

(52) U.S. Cl. ...... 375/359; 340/3.2; 340/681; 73/861.06; 704/218; 359/560

(58) Field of Classification Search .................. None
See application file for complete search history.

(56) References Cited

U.S. PATENT DOCUMENTS

| 5,809,060 | A | * | 9/1998 | Cafarella et al. | 375/146 |
| 2002/0048333 | A1 | * | 4/2002 | Ahmed et al. | 375/346 |
| 2004/0179507 | A1 | | 9/2004 | Batra | |
| 2005/0220175 | A1 | | 10/2005 | Zhou | |

FOREIGN PATENT DOCUMENTS

WO    WO0077961 A1    12/2000
WO    WO03101002 A1   12/2003

OTHER PUBLICATIONS

Heoti-Uk Lee et al., "Efficient Structures of Packet/Frame Synchronization in MB-OFDM UWB", Intelligent Signal Processing and Communication Systems, 2004, ISPACS 2004, Proceedings of the 2004 Int'l Symposium on Seoul, Korea, Nov. 2004, pp. 472-476, XP010806146.

H. Kobayashi et al., "Proposal of Symbol Timing and Carrier Frequency Synchronization Methods for Burst Mode OFDM Signal", IEICE Transactions on Communications, vol. E86-B, No. 1, pp. 238-246, Jan. 2003.

* cited by examiner

*Primary Examiner* — David C. Payne
*Assistant Examiner* — Adolf Dsouza
(74) *Attorney, Agent, or Firm* — Larry Liberchuk

(57) ABSTRACT

A synchronization sequence (preamble) that is known to the receiver forms as an integral part of packet-based digital communication systems. The first operation in such digital communication systems is the detection of the beginning of a valid signal (packet). A system, apparatus, and method for a scheme to robustly detect the preamble are provided having a hierarchical cross-correlator in combination with a second stage delayed auto-correlator using the output of the cross-correlator as an input to the second stage correlator.

15 Claims, 9 Drawing Sheets

SYSTEM, APPARATUS, AND METHOD FOR A ROBUST SYNCHRONIZATION SCHEME FOR DIGITAL COMMUNICATION SYSTEMS

The present invention relates to a system, apparatus and method for synchronization in a packet-based digital communication system, including one having simultaneously operating piconets (SOPs).

A synchronization sequence (preamble) that is known to the receiver forms an integral part of packet-based digital communication systems. This synchronization sequence is transmitted as a preamble (sent first) of the rest of the packet. There are many ways of designing this synchronization sequence. One approach that has appeared lately is the use of repeated sequences, or hierarchical sequences. This type of approach has been proposed to the IEEE 802.15.3 a task group as early as July 2003 under the Multi-band COFDM (MBOA) proposal as the next generation high-rate ultra-wideband (UWB) system. The preamble consists of a sequence comprising a time-domain sequence and a frequency-domain sequence. The time domain sequence is primarily used for burst detection, timing error estimation, frequency error estimation and AGC setting.

A straight forward application of delayed correlation to systems such as the MBOA system is not efficient. First, it does not exploit the sequence property. Thus, it is 'blind' to the type of sequence that is transmitted. As a result, it is expected to perform poorly under simultaneously operating piconets (SOP). Additional processing is needed to identify the sequence. Second, it does not perform well under low SNR, narrow-band interference, and DC offset conditions.

Some form of cross-correlation is thus needed for fast acquisition under such conditions.

The system, apparatus and method of the present invention provide a new and robust hierarchical cross-correlator in combination with a second stage delayed auto-correlator using the output of the cross-correlator as an input to the second stage correlator.

Without loss of generality, the parameters of the MBOA proposal are used in the subsequent discussion of the present invention.

The MBOA proposal is a multi-band scheme where the time domain sequence transmitted in each band is described by $$[a_0 B, a_1 B, \ldots, a_{15} B] \qquad (0.1)$$

where B is an 8-length spreading sequence and $A=\{a_0, \ldots, a_{15}\}$ is an 16-length sequence. The values of both sequences are proposed to be unique for each piconet. This sequence construction is commonly known as an hierarchical sequence. Overall, for each band, a 128-length sequence is constructed consisting of the 128-length sequence as defined above (0.1). A prefix (e.g., appending the last certain bits and adding just zeros) can also be added to increase the length of the transmitted sequence.

When transmitted, a sequence similar to the above description can also be processed further to flatten the spectrum using conventional techniques such as FFT operations. Such a post-processed sequence may give the appearance that it is different from the original hierarchical sequence. However, a closer look at a post-processed sequence reveals that the sequence is a hierarchical sequence similar to the original sequence. In general, the synchronization algorithm is based on detecting the hidden hierarchical sequence as described in the following sections.

The most frequent correlation technique used in WLANs is a delayed auto-correlation on the received signal. The delayed correlation is organized in the form of correlating subsequent sequences where the delay is equal to the length of one sequence (symbol). The conventional delayed auto-correlation can be expressed with $$f(m) = \sum_{k=0}^{J-1} r(m-k) r^*(m-D-k) \qquad (0.2)$$

where r(m) is the received samples, D is the delay, J is the correlation window, and '*' denotes complex conjugate. The received signal is modeled as below $$r(m) = x(m) e^{-j(2\pi \epsilon T m + \alpha)} + n(m) \qquad (0.3)$$

where x(m) is the convolution result of the channel and the transmitted sequence, $\epsilon$ is the frequency error between the transmitter and receiver, T is the sampling rate, $\alpha$ denotes the phase error between the transmitter and receiver oscillators, and n(m) denotes noise (or unwanted interference). In the above model, we have intentionally neglected sampling clock error since the performance impact of sampling clock error on correlation is negligible. Substitution of (0.3) in (0.2), we obtain $$f(m) = e^{-j2\pi \epsilon T D} \sum_{k=0}^{J-1} x(m-k) x^*(m-D-k) + N(m) \qquad (0.4)$$

where N(m) is the un-desired signal term. Assuming that the channel is static, the ideal auto correlation peak occurs when $x(m)=x(m-D)$. Using this, the ideal peak occurs at $$f(m) = e^{-j2\pi \epsilon T D} \sum_{k=0}^{J-1} |x(m-k)|^2 + N(m) \qquad (0.5)$$

Notice that the magnitude of the autocorrelation is independent of frequency error. This makes this technique extremely robust against frequency error. In addition, if the inter-symbol phase rotation ($\epsilon TD$) is small, then the real portion of f(m) contains useful information that is adequate for peak detection. The imaginary component of f(m) is dominated by the undesired signal.

An alternative solution is to exploit the hierarchical nature of the preamble and a delayed hierarchical correlation technique has been proposed. This latter technique is a hierarchical-delayed correlator that is composed of a first auto-correlation over 8 samples followed with a cross-correlation using 15 samples. The hierarchical delayed-autocorrelation inherits the performance benefits of the conventional correlation algorithm in terms of its robustness to frequency/phase errors and it is simple to implement. However, it does not make use of the spreading sequence B. As a result, it is blind to the contents of this sequence. In addition, it shares some of the weaknesses of conventional auto-correlators since the inner part is essentially an auto-correlator that is not as robust as cross-correlation techniques.

A preferred embodiment first performs a correlation over sequence B (i.e., de-spread sequence B) and then performs a correlation over sequence A. The hierarchical cross-correlator inherits the properties of conventional cross-correlators, i.e., more sensitivity to frequency error but more robustness to noise. Nevertheless, for current UWB applications, the cross-correlator is not sensitive to frequency error since the phase rotation within a symbol due to frequency error is negligible.

The scheme of the present invention has the following advantages: it is robust to noise and interference, it provides the frequency error directly without any additional computation, it provides information that is necessary to position the FFT window for an OFDM-based modulation, the real part of the peak can be used for frame synchronization, and finally, of course, it provides the peak for burst detection purposes.

It is to be understood by persons of ordinary skill in the art that the following descriptions are provided for purposes of illustration and not for limitation. An artisan understands that there are many variations that lie within the spirit of the invention and the scope of the appended claims. Unnecessary detail of known functions and structure may be omitted from the current descriptions so as not to obscure the present invention. In light of this, the following descriptions are particularized for MBOA but one skilled in the art can readily apply these discussions to any packet-based digital communication systems.

In a preferred embodiment, the system, apparatus and method of the present invention provide a hierarchical cross-correlation or H-Xcorr method based on computing $$f(m) = \sum_{l=0}^{L-1} a_l \sum_{k=0}^{M-1} r(m - Ml - k) b_k \qquad (0.6)$$

which, using (0.3), yields $$f(m) = e^{-j(2\pi\epsilon Tm + \alpha)} \sum_{l=0}^{L-1} a_l \sum_{k=0}^{M-1} x(m - Ml - k) e^{j2\pi\epsilon T(Ml+k)} b_k + \tilde{N}(m) \qquad (0.7)$$

Figure 1:
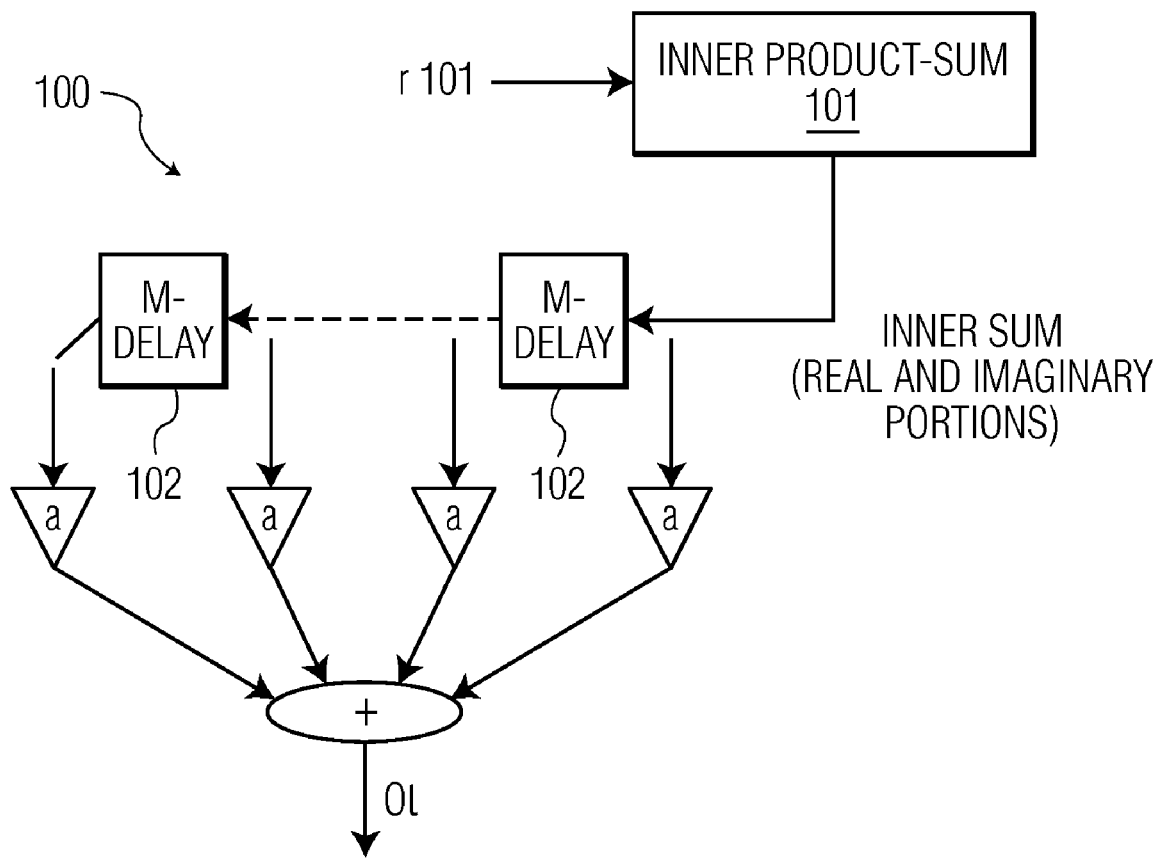
FIG. 1 illustrates a simplified diagram of an hierarchical cross-correlator.

The inner product de-spreads the B sequence while the outer sum de-spreads the A-sequence. Notice that this method inherits the properties of cross-correlation techniques in that its result depends on frequency offset and phase error. Nevertheless, peak detection based on evaluating $|f(m)|^2$ reduces dependency on frequency/phase error to a large extent. However, the frequency error could impact performance due to the term $e^{j2\pi\epsilon T(Ml+k)}$. For UWB applications, assuming a 40 ppm frequency offset error, sampling rate of 500 MHz and center RF frequency of 5 GHz, $\epsilon = 40e-6 \times 5e9/500e6 = 200e3/500e6 = 400e-6$. The maximum phase rotation thus equals $e^{j2\pi 400e-6(M^*(L-1)+M-1} = e^{j2\pi 400e-6(127)} \approx 1+j0.3$. Thus, the impact of the frequency error is negligible. The system, apparatus and method of the present invention provide increased performance when impairments are present, including, noise, multi-Pico-net, narrowband interference, and DC offset. Nevertheless, the complexity of the implementation increases compared to some alternative techniques being proposed. FIG. 1 illustrates a simplified block diagram of the hierarchical correlator H-Xcorr.

Figure 3:
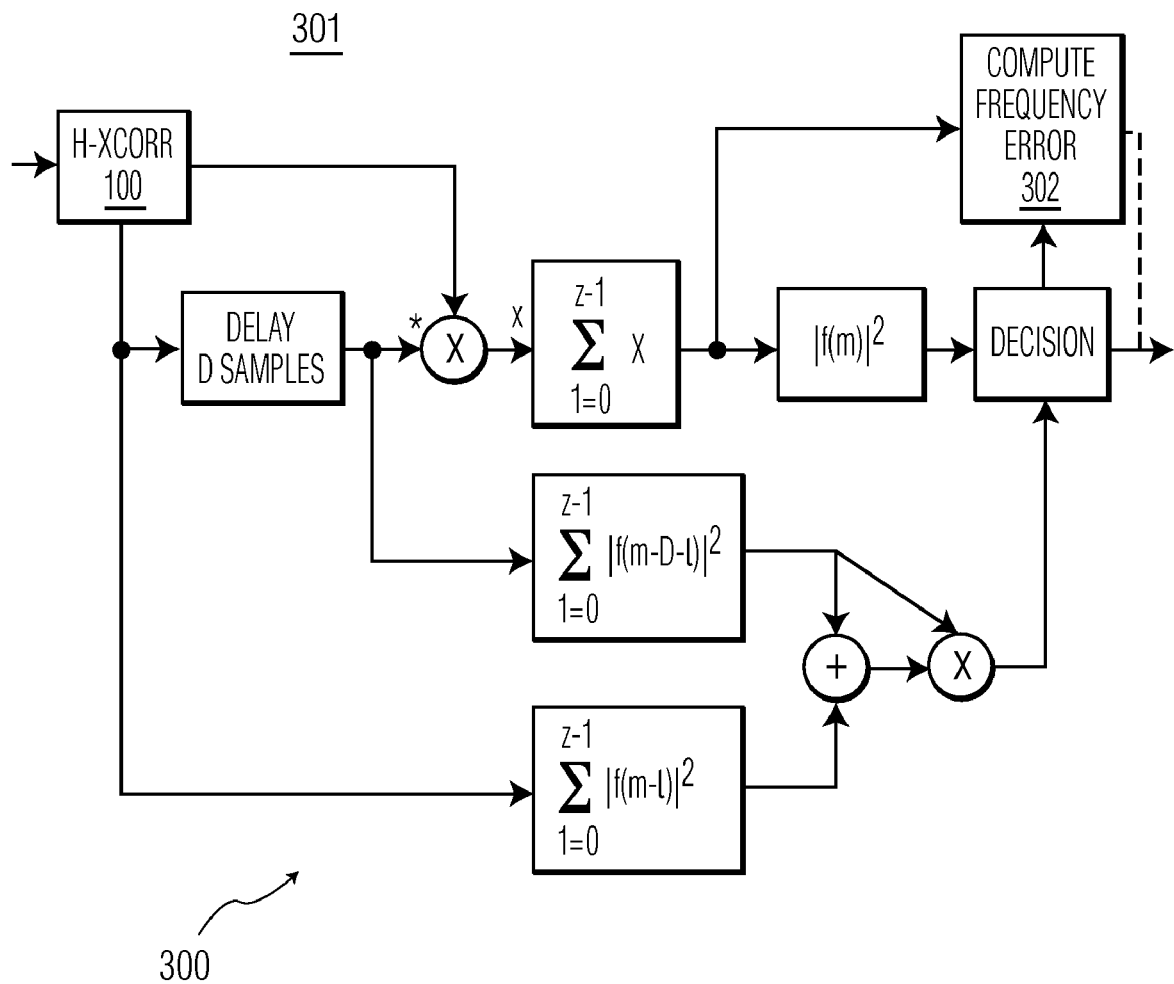
FIG. 3 illustrates the core of the synchronization scheme with frequency error computation.
Figure 4:
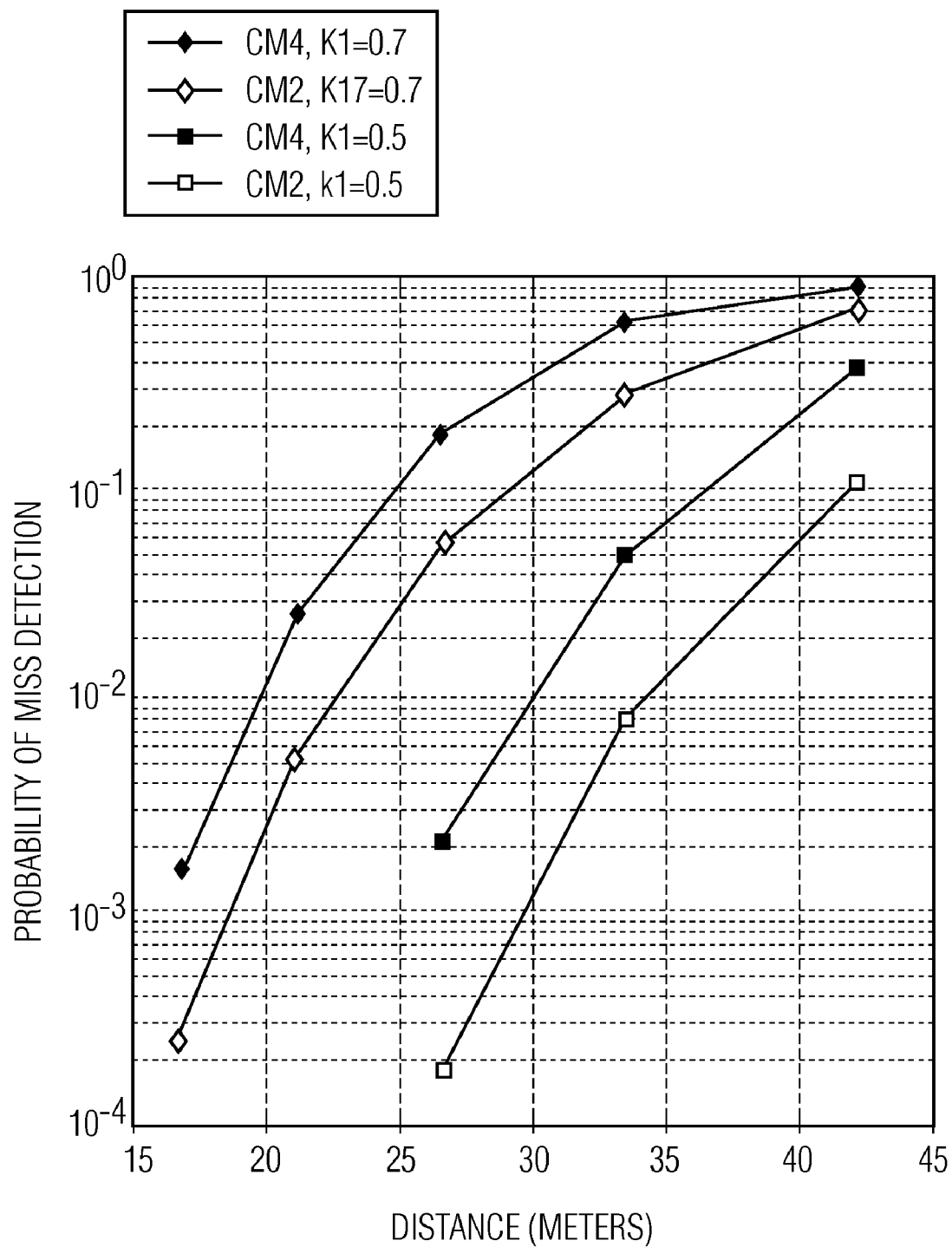
FIG. 4 illustrates simulation results for TFC 1 where reducing $K_1$ improves performance for this TFC mode and showing that the higher value of $K_1$ still provides sufficient performance providing <$10^{e-5}$ error rate at 10 m for the 110 Mbps mode.
Figure 5:
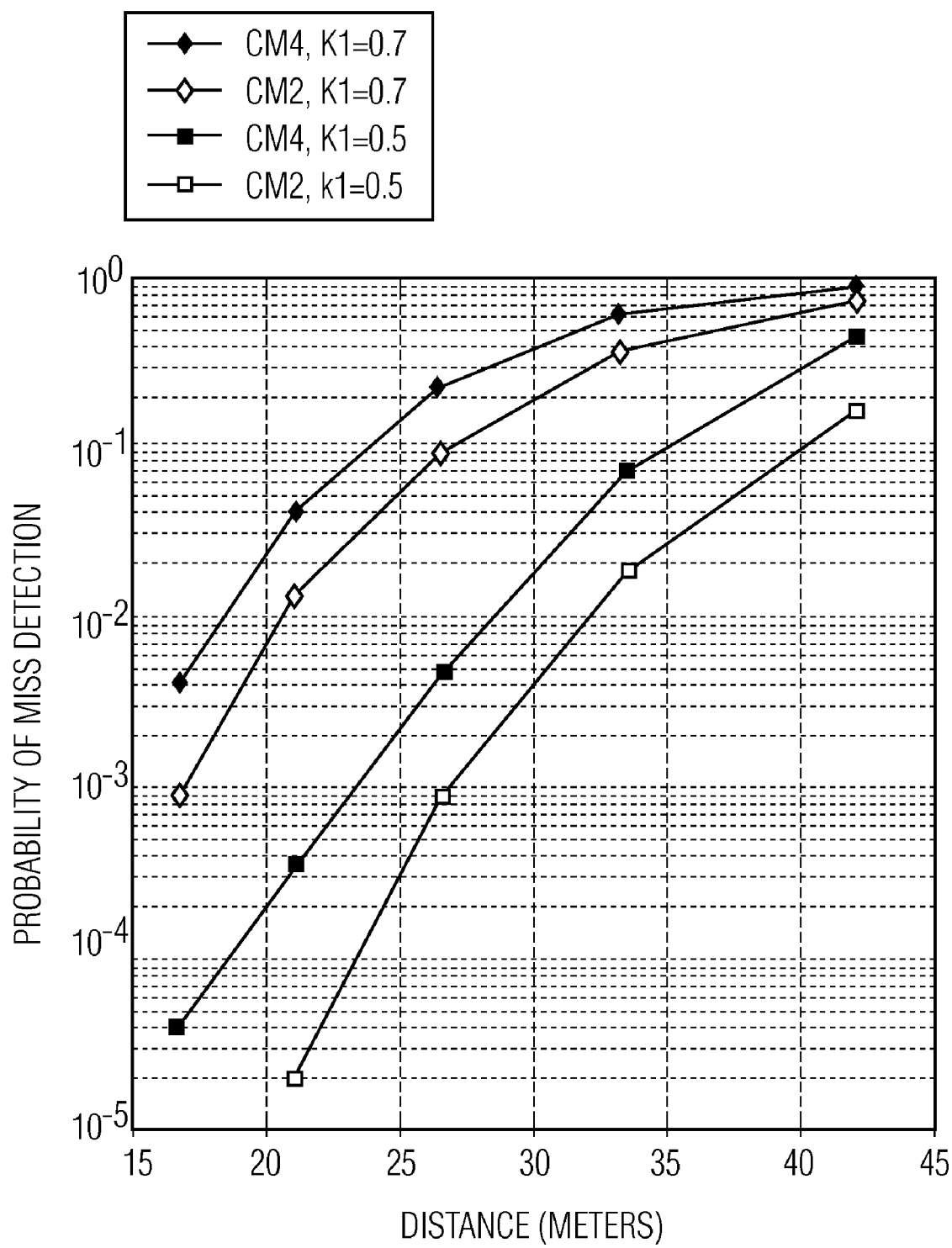
FIG. 5 illustrates simulation results for TFC 3.

The performance of the synchronizer can be improved greatly by employing a second stage correlation 301 using the output of the H-Xcorr 100 as an input to it, see FIG. 3. This second step is in fact part of the MMSE detector described in the following section.

Notice that for the H-Xcorr, peak occurs when $$f(m) = f(m-D) e^{j2\pi\epsilon TD} + \tilde{N}(m) \qquad (0.8)$$

where D is the number of samples between subsequent symbols in a band. In the absence of undesired signal (interference), f(m) will be equal to the channel impulse response. Thus, in principle, assuming static channels, one can employ correlation across the impulse response of the channel as follows $$\hat{f}(m) = \sum_{l=0}^{Z-1} f(m-l) f^*(m - D - l) \qquad (0.9)$$

where Z is the number of samples not greater than the delay spread of the channel. At the desired peak, the use of (0.8) in the above equation yields $$\hat{f}(m) = e^{-j2\pi\epsilon TD} \sum_{l=0}^{Z-1} |f(m-l)|^2 + \tilde{N}(m) \qquad (0.10)$$

Notice that the above processing accomplishes a number of computations in one step. First, it provides the frequency error directly, $$\epsilon \approx -\frac{\text{angle}(\hat{f}(m_{peak}))}{2\pi TD} \qquad (0.11)$$

Secondly, the peak of $|\hat{f}(m)|^2$ coincides with the peak of the sum of the energy of the impulse response of the channel over the window Z. This information is very useful to set the start of the FFT window for an OFDM-based system. Thirdly, the real part of the peak is used for frame sync detection. And finally, of course, it provides the peak for burst detection purposes. These are described again in the subsequent sections.

Figure 2A:
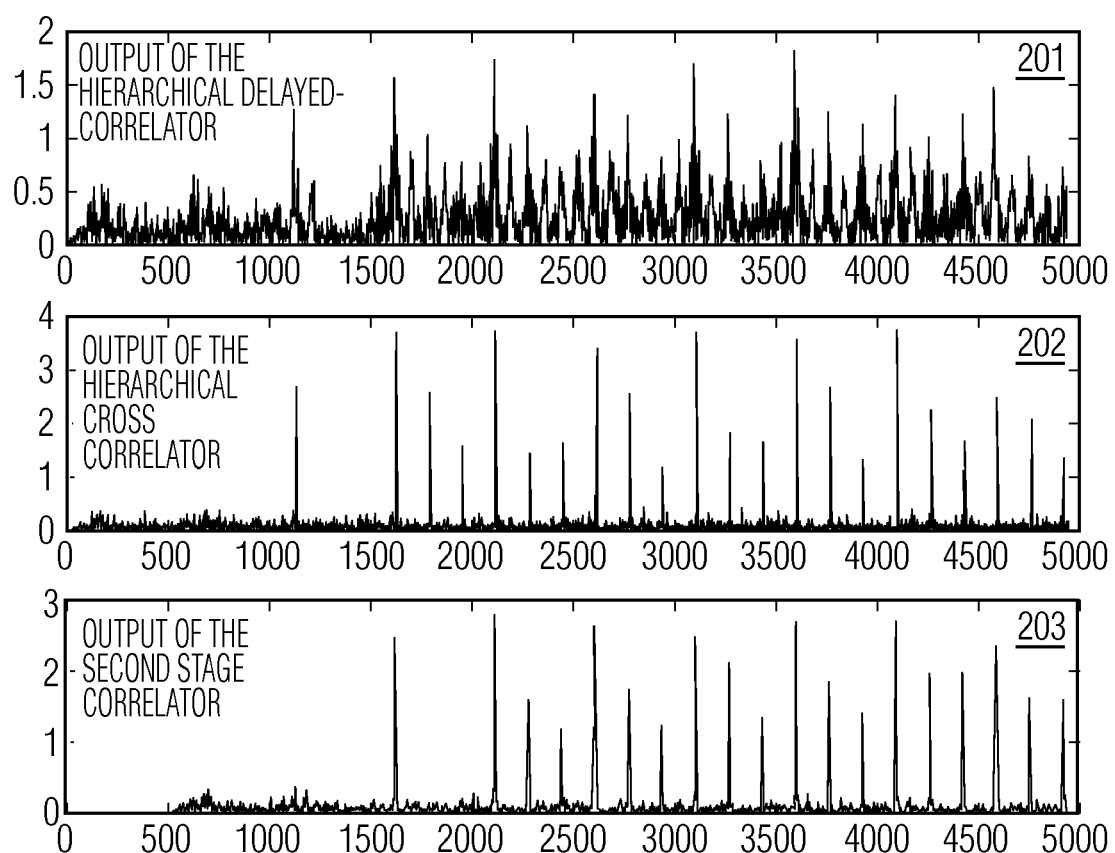
FIG. 2 illustrates simulated output of the correlator for AWGN and CM4 channel, Z=8.
Figure 2B:
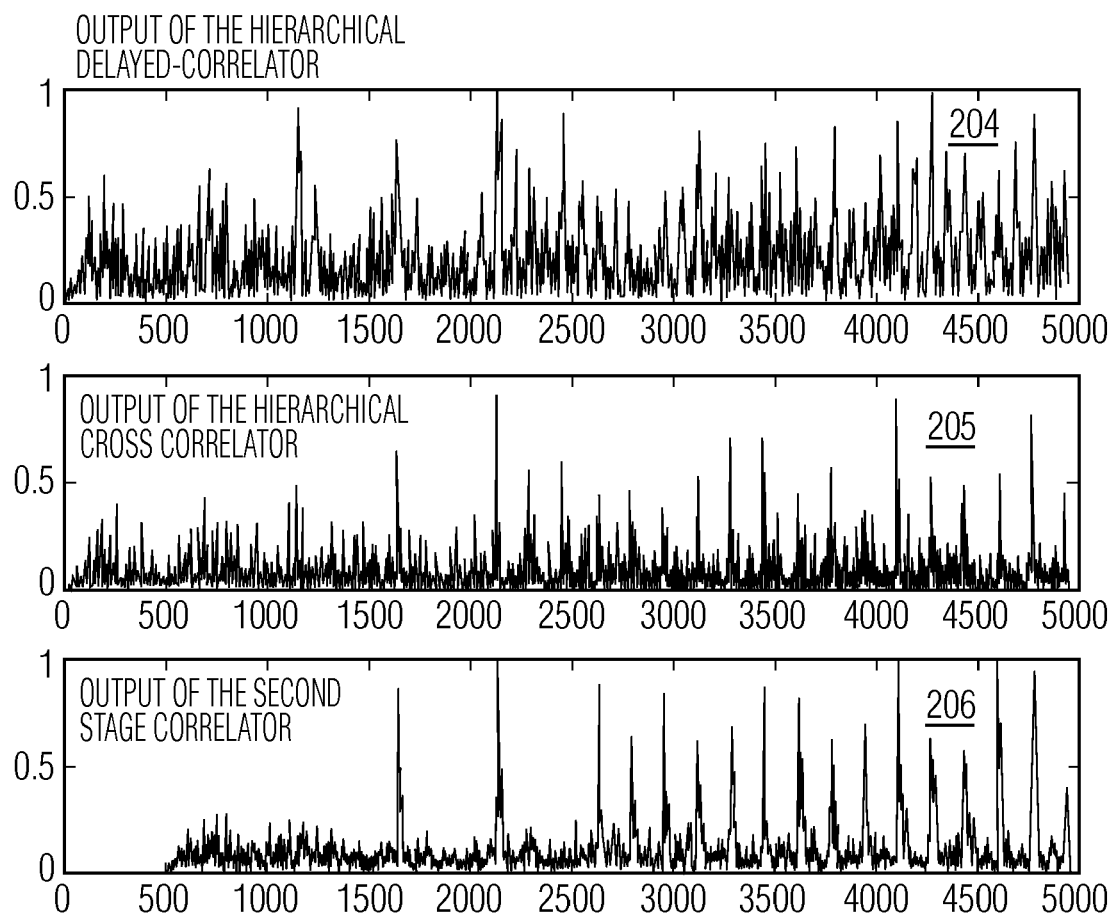

FIG. 2 presents the simulated output of the three versions of the correlation techniques. Notice the performance gain from the second stage delayed auto-correlator, especially in the case of severe multipath and noise. Notice also the performance gain of the second stage correlator. The peaks are more distinct than that of the other two techniques. The first part of the input data is random data to stress the correlator.

The first operation in wireless communication systems is the detection of the beginning of a valid signal (packet), some times referred to as burst detection or peak detection. Burst detection is accomplished by evaluating the correlation output. The most frequent technique used for burst detection is based on comparing the magnitude of the f(m) to a certain fixed threshold. The threshold value is a function of the noise level, the AGC setting and expected signal strength. Usually, the AGC is set to max at the beginning to capture the weak signals. Since this method is based on a threshold, it is naturally sensitive to the threshold value and hence its performance can be impacted by noise.

A preferred embodiment of the present invention is an MMSE-based peak detector on the output of the H-Xcorr. As indicated above and shown below, the second-stage correlator computes part of the computation needed for this detector.

Based on the relation described in (0.8), the MMSE detector on the output of the H-Xcorr is described by $$\arg\max_m \left\{ \sum_{l=0}^{Z-1} |f(m-l)e^{-j\beta} - f(m-D-l)|^2 \right\} \quad (0.12)$$

Further simplification of the above equation yields $$\arg\max_m \left\{ \sum_{l=0}^{Z-1} (|f(m-l)|^2 + |f(m-D-l)|^2 - 2\operatorname{Re}\{f(m-l)f^*(m-D-l)e^{-j\beta}\} \right\} \quad (0.13)$$

Using (0.8), estimate $$e^{j\beta} \approx \frac{\sum_{l=0}^{Z-1} f(m-l)f^*(m-D-l)}{\sum_{l=0}^{Z-1} |f(m-D-l)|^2} \quad (0.14)$$

The use of (0.14) in (0.13) and further simplification yields [see Appendix]

$$\arg\max_m \left\{ h_1(m) + h_2(m) - 2\frac{|\hat{f}(m)|^2}{h_2(m)} \right\} \quad (0.15)$$

where $$h_1(m) = \sum_{l=0}^{Z-1} |f(m-l)|^2, \text{ and } h_2(m) = \sum_{l=0}^{Z-1} |f(m-l-D)|^2$$

From these, note that in the absence of additive interference (AWGN, etc)

$$|\hat{f}(m)|^2 \leq \frac{1}{2}[h_1(m) + h_2(m)]h_2(m) \quad (0.16)$$

where the equality holds at the peak. $\hat{f}(m)$ is computed by the second stage correlator described above. Ideally, it is sufficient to check the equality condition to determine if the input signal contains the required preamble. Nevertheless, in practical systems, the equality condition is not generally true.

Thus, the following condition is checked to determine if the input signal is composed of a valid preamble.

$$|\hat{f}(m)|^2 \geq k_1 \frac{1}{2}[h_1(m) + h_2(m)]h_2(m) \quad (0.17)$$

where $k_1$ is constant, $k_1 < 1$. Naturally, the peak of the correlation, i.e. peak of $|\hat{f}(m)|$ forms the point for the MMSE solution provided that (0.17) is satisfied. In general, $k_1$ is related to the input SNR, the lower the SNR, the lower $k_1$. However, since information about the SNR is not available, $k_1$ is set to the lowest value that makes it sensitive to trigger on far-away signals. In this case, undesired close-by signals may result in false alarm. In order to prohibit this, additional conditions must be satisfied $$> k_2 \sum_{l=0}^{N-1} |f(m-D-l)|^2 + |f(m-l)|^2 \text{ and} \quad (0.18)$$

$$|\hat{f}(m)| > k_3 \sum_{l=0}^{N-1} |r(m-l)|^2 \text{ and}$$

$$> k_4$$

where N equals approximately the symbol length. The right-hand part of the above equations, in a preferred embodiment, are implemented (approximated) using only first order low-pass filters. Notice that $K_3$ has to be chosen carefully so that unnecessary miss detection does not occur, especially during SOP and high AGC gains. Exemplary values are $k_1=0.5$, $N=128$, $Z=18$, $k_2=12$, $K_3=1/16$, and $k_4=\text{ADC\_max}^4/120$.

FIG. 3 is a simplified illustrative diagram of the core of the synchronization scheme with frequency error computation 302.

In the MBOA proposal, the frame sync is the point where the synchronization preamble ends and the OFDM symbols starts. In a preferred embodiment, a modified maximum-likelihood (ML) decision rule is used on the differentially demodulated data. The ideal ML decision would be based on finding $$\sum_{k=0}^{l-1} \|s_k^0 - \hat{f}(m_{peak} - Dk)e^{-j\beta}\|^2 < \sum_{k=0}^{l-1} \|s_k^g - \hat{f}(m_{peak} - Dk)e^{-j\beta}\|^2 \quad (0.19)$$

for all $g > 0$ where $s^g$ is the set of all possible combination of bits, and $s^0$ is the set of the differentially encoded frame sync cover sequence. Further simplification of this (since $S_k^g = \pm 1$) results in $$\sum_{k=0}^{l-1} s_k^0 \operatorname{Re}\{\hat{f}(m_{peak} - Dk)e^{-j\beta}\} > \sum_{k=0}^{l-1} s_k^g \operatorname{Re}\{\hat{f}(m_{peak} - Dk)e^{-j\beta}\} \quad (0.20)$$

for all $g > 0$

At this point, an assumption is made to simplify the implementation. First, the phase-rotation due to frequency error is assumed not to exceed 90°. Secondly, only one set (all 1s) of the left-hand term of (0.20) is checked. Using these, the implementation-friendly decision takes the form of $$\sum_{k=0}^{l-1}(s_k^0-1)\operatorname{sgn}[\operatorname{Re}\{\hat{f}(m_{peak}-Dk)\}]|\hat{f}(m_{peak}-Dk)|^2 > \qquad (0.21)$$

$$k_5 \times \sum_{k=0}^{l-1}|\hat{f}(m_{peak}-Dk)|^2$$

One can also further simplify the above equation by assuming that the phase-rotation due to frequency error is very small. This yields the following more simplified decision rule. This rule is used in the simulations presented below.

$$\sum_{k=0}^{l-1}(s_k^0-1)\operatorname{Re}\{\hat{f}(m_{peak}-Dk)\} > k_5 \times \sum_{k=0}^{l-1}|\operatorname{Re}\{\hat{f}(m_{peak}-Dk)\}| \qquad (0.22)$$

$k_5$ is a constant, $0 < k_5 < 1$. For MBOA, $I \geq 3$. The method is nothing but differential detection of the frame sync sequence using soft decision variables as opposed to hard-decision values. Notice that high frequency error that results in phase rotation more than 90° will make frame sync detection very difficult. Nevertheless, for 20 ppm crystal error, phase rotation on the lower three bands will not exceed 90°. For the higher bands, careful consideration should be paid to the frame sync detection as well as the frequency error estimation provided below. Performance enhancement could be achieved by first compensating for frequency error and using non-differential detection.

Figure 6:
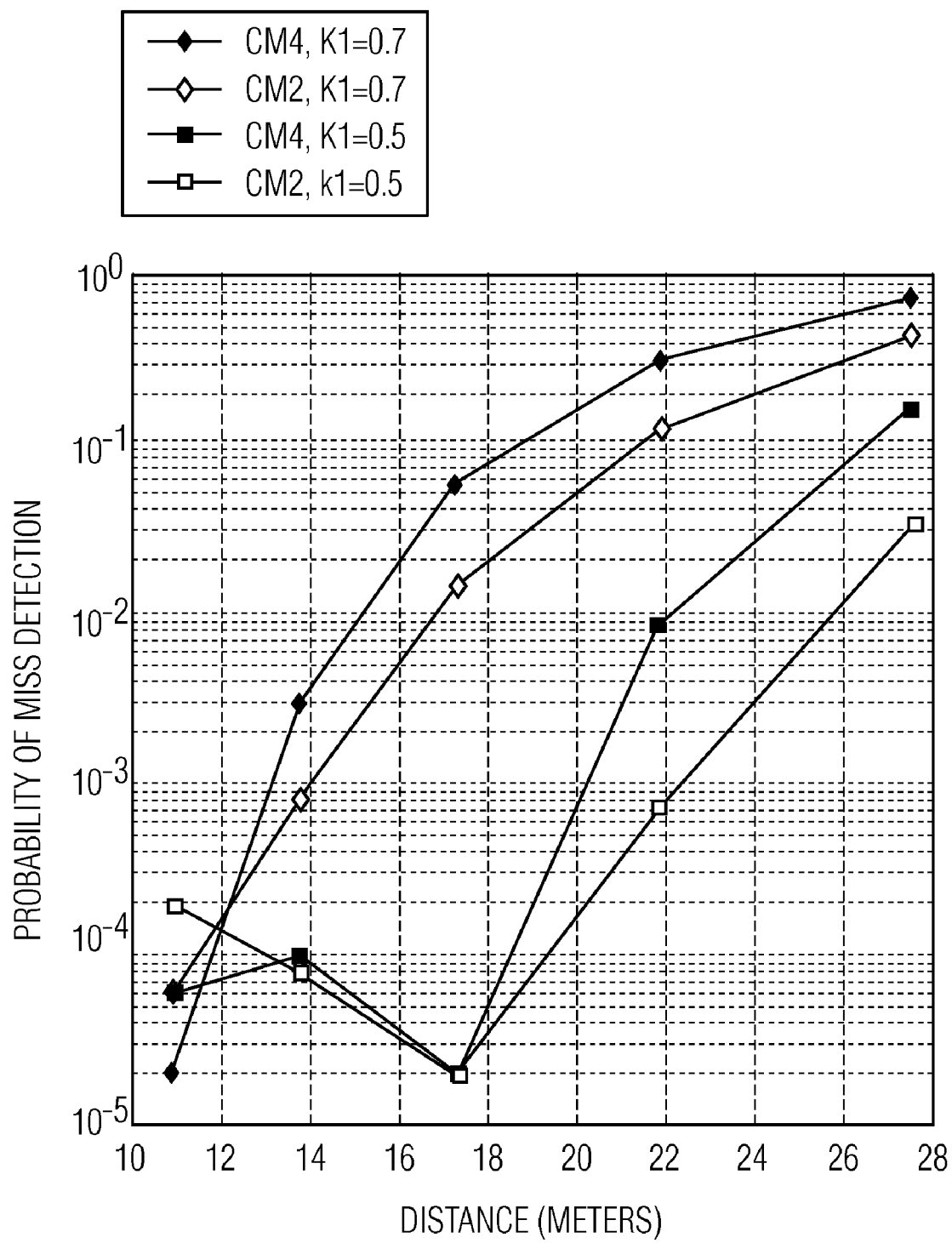
FIG. 6 illustrates simulation results for TFC5.
Figure 7:
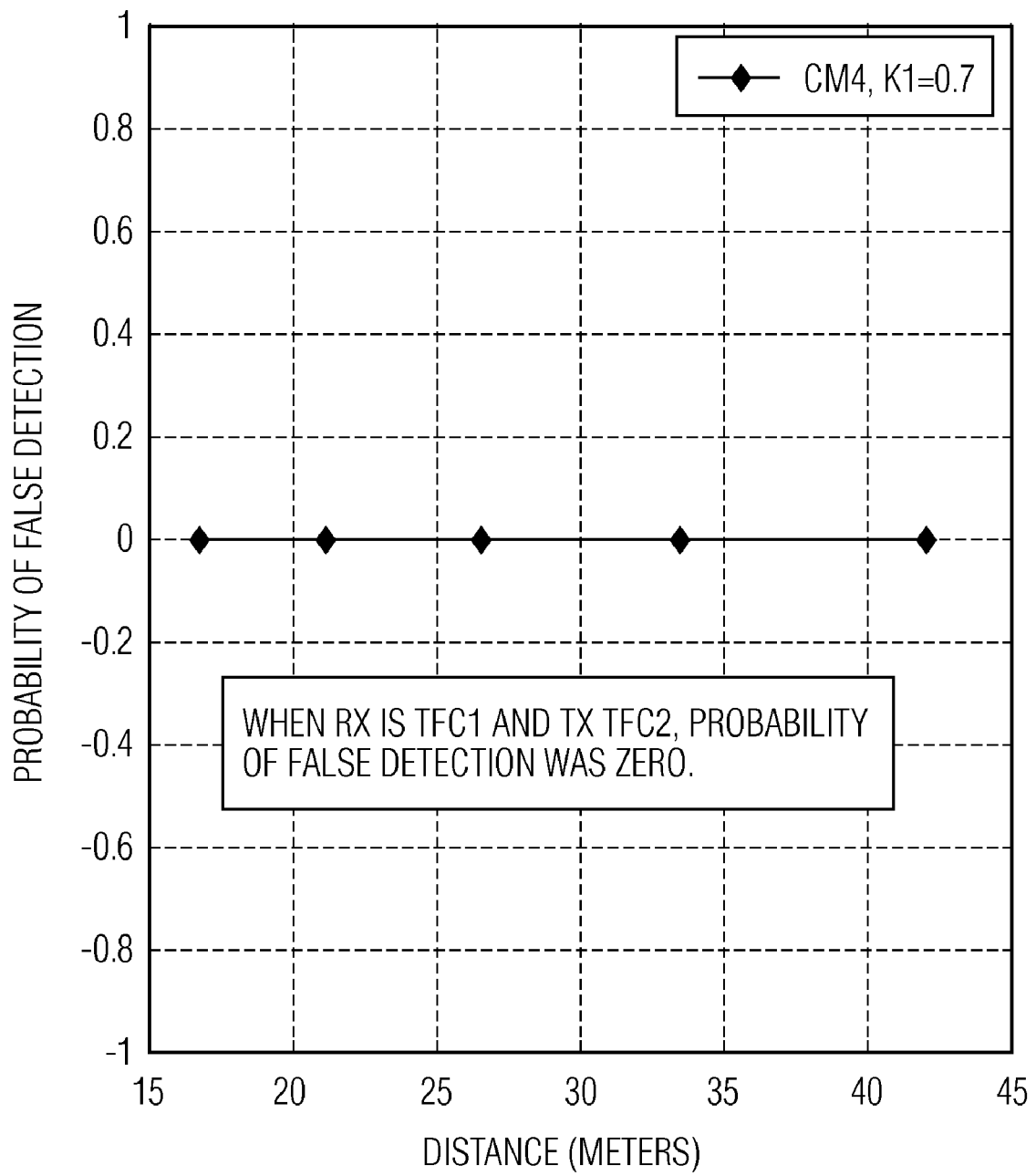
FIG. 7 illustrates simulation results for TFC5.

In order to evaluate the performance of the preferred embodiment of the present invention, several simulations were carried out. The plots of FIGS. 4-7 show the simulation results for several simulation conditions. Each point is averaged over 50000 noise realizations (each of the 100 channels simulated for 500 packets). The packet structure is such that the first few symbols are filled with OFDM data, then followed with the preamble. This is done to explore the impact of false detection. The results are for complete acquisition, i,e., initial burst detection followed by frame sync detection. The dual-stage configuration is used for this simulation. The other modes, i.e., the hierarchical auto-correlator and the stand-alone H-Xcorr are not as reliable as the H-Xcorr followed with an MMSE detector, of the present invention. As explained earlier, the second-stage correlator following the H-Xcorr forms part of the MMSE detector. In FIG. 6, the rather high error rate for close-by signals and $K_1=0.5$ is caused by false detection on normal OFDM signals (i.e., the first part of the packet used for this simulation). This is mainly due to using a low value of $K_1$, making it sensitive to noise. In principle, this does not fall under miss-detection probability. Nevertheless, this is presented to illustrate the impact of a low $K_1$ value. While such values improve performance for weak signals, they can cause unnecessary detection of unwanted strong-energy signals. Notice the absence of false detection at the distance illustrated in FIG. 7.

Timing (Optimum Start of the FFT Window)

It is well known that the optimal FFT window is one that is based on including the maximum channel energy in the window. As mentioned earlier, the peak of $|\hat{f}(m)|^2$ corresponds to the peak of the sum of the impulse response of the channel within a window of Z. Thus, the peak of this correlation window forms the reference for the start of the FFT window. For an MBOA proposal, the start of the FFT window is preferably set to $m_{peak}-Z-128$.

Carrier Frequency Error Estimation and Correction

A frequency error between the transmitter and receiver will result in inter-carrier interference and phase rotation. For a UWB system, the carrier frequency error is small compared to the inter-carrier spacing. For example, for a 40 ppm error and 5 GHz center frequency, the frequency error is 200 KHz. This is about 4.8% of the inter-carrier spacing. Such a frequency error does not result in significant degradation due to inter-carrier interference. Nevertheless, it still results in significant degradation due to phase rotation. As a result, the frequency error must be compensated. The compensation of the frequency error can be divided into coarse and fine compensation. The coarse frequency error is compensated for using a digital mixer. The fine frequency error is compensated for using a phase rotator after FFT.

Since the center frequencies are derived from a single crystal, it is tempting to think that only one frequency error for all the bands is needed. Even if one center crystal is used, the frequency error for all the bands is not identical. Generally, the frequency error in a given band equals ppm*Fc, where ppm is the parts-per-million error of the crystal, and Fc is the crystal frequency. As a result, the frequency error won't be identical. However, since the center frequencies are derived from one crystal, the error among all the bands have a determinate relationship. One may use this information to improve performance in one of the bands if the estimated frequency in this band gets corrupted by heavy interference (i.e., eliminate the outlier). Nevertheless, the frequency error estimation accuracy in each band is dependent on the SNR of the signal in that band. Since the SNR can vary due to fading and interference, using one band's estimation for the others requires careful consideration of the operating conditions to avoid degrading the estimation accuracy.

Simulation has shown that the performance of the system can be improved by averaging the estimation over the number of preamble data that is available after burst detection. Thus, the frequency error for each band is computed using $$\varepsilon \approx -\frac{\operatorname{angle}\left(\sum_{k=0}^{W-1}\hat{f}(m_{peak}-Dk)\right)}{2\pi TD} \qquad (0.23)$$

This is essentially averaging the value of the correlation at peak and then computing the angle, a very elegant but robust technique. For an MBOA system, D=165*3 for TFC types 1 and 2. In addition, the MBOA preamble contains a cover sequence. Thus, the product of the cover sequence of two symbols separated by D samples is not 1 and the above averaging will not work. The frame sync sequence is one example. Thus, for MBOA, the above equation is modified to $$\varepsilon \approx -\frac{\operatorname{angle}\left(\sum_{k=0}^{W-1}\hat{f}(m_{peak}-Dk)\times\operatorname{sign}[\operatorname{Re}\{\hat{f}(m_{peak}-Dk)\}]\right)}{2\pi TD} \qquad (0.24)$$

It is important that the performance of the core baseband front-end (sync, frequency error estimation, timing error estimation) are not affected by the following impairments.

1. DC Offset

Typically, some residual DC signal comes from the RF/ADC front end. It can easily be seen that the output of the cross-correlator for DC input is zero. This is due to the fact that the reference sequence is zero-mean. Since all the other processing is done using the output of the H-Xcorr, then, it follows that the total system is insensitive to DC offset.

2. Narrowband Interference (NBI)

For slowly varying narrowband interference, the behavior the H-Xcorr is similar to that with the DC input, i.e., relatively insensitive to slowly varying NBI. However, for rapidly varying NBI, the N-Xcorr performance depends on the cross-correlation property of the local reference sequence and the interferer. However, considering the pseudo-random nature of the sequence and deterministic nature of the interference, the output of the H-Xcorr is significantly less than the power of the interferer and thus very little performance impact is expected.

3. Simultaneously Operating Piconets (SOP)

The use of H-Xcorr combined with an MMSE detector provides powerful rejection of unwanted signals, such as SOPs. This is illustrated in the simulation results provided above.

Figure 8:
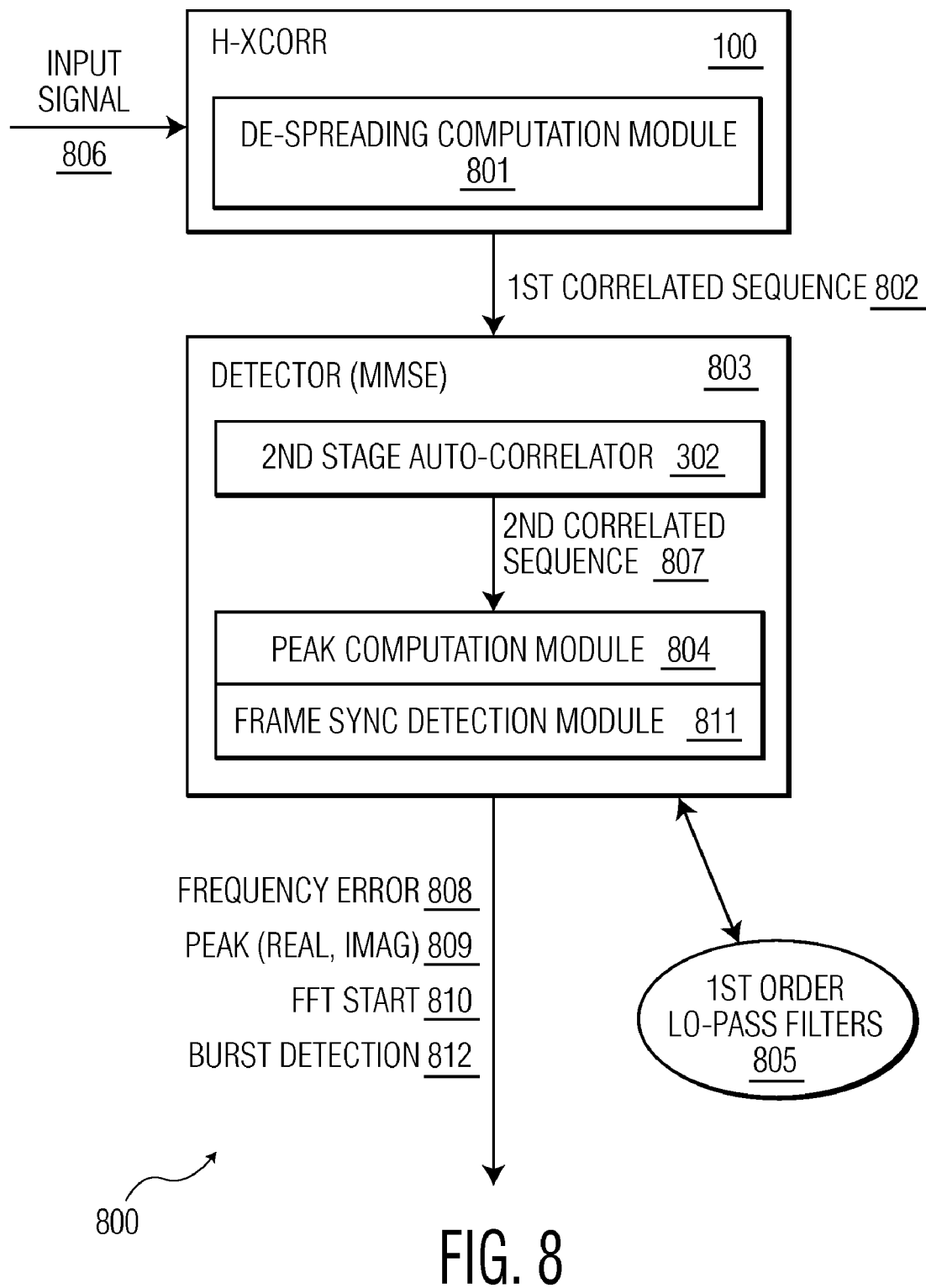
FIG. 8 illustrates a system used for synchronization in a packet-based digital communication system.

Referring now to FIG. 8, a system 800 is illustrated for synchronization in a packet-based digital communication system that includes at least one simultaneously operating piconet. The system 800 comprises an hierarchical cross-correlator (H-Xcorr) computation module 100 that includes a de-spreading computation module 801 to de-spread an input signal comprising an hierarchical synchronization sequence having a fixed length, and output a first correlated sequence computed from the de-spread input signal. The system 800 further comprises a minimum mean squared error (MMSE) detector 803 that includes a second stage auto-correlator computation module 301 that receives the first correlated sequence and computes a second correlated sequence delayed by the fixed length, and a peak computation module 804 to receive the second sequence and compute therefrom a frequency error and a peak having a real part. In addition, the detector 803 uses the peak to set a start of an FFT window for an OFDM-based modulation, the real part of the peak for detection of a frame sync, and the peak for burst detection purposes.

While the preferred embodiments of the present invention have been illustrated and described, it will be understood by those skilled in the art that the system, apparatus and methods as described herein are illustrative and various changes and modifications may be made and equivalents may be substituted for elements thereof without departing from the true scope of the present invention. In addition, many modifications may be made to adapt the teachings of the present invention to a particular synchronizing situation without departing from its central scope. Therefore, it is intended that the present invention not be limited to the particular embodiments disclosed as the best mode contemplated for carrying out the present invention, but that the present invention include all embodiments falling within the scope of the claim appended hereto.

APPENDIX

Derivation of Equation (0.15)

(0.13) can be re-written as $$h_1(m) + h_2(m) - 2\sum_{l=0}^{Z-1} \text{Re}\{f(m-l)f^*(m-D-l)(\cos(\beta) + j\sin(\beta))\} \quad (0.25)$$

Considering only the left-hand term of the above equation and further expansion, we find $$z(m) = \sum_{l=0}^{Z-1} \text{Re}\{f(m-l)f^*(m-D-l)(\cos(\beta) - j\sin(\beta))\} \quad (0.26)$$

$$= \cos(\beta)\sum_{l=0}^{Z-1} \text{Re}\{f(m-l)f^*(m-D-l)\} +$$

$$\sin(\beta)\sum_{l=0}^{Z-1} \text{Im}\{f(m-l)f^*(m-D-l)\}$$

The use of (0.9) and (0.14) in the above equation yields $$z(m) = \frac{1}{h_2(m)}[\text{Re}\{\hat{f}(m)\}\sum_{l=0}^{Z-1} \text{Re}\{f(m-l)f^*(m-D-l)\} + \quad (0.27)$$

$$\text{Im}\{\hat{f}(m)\}\sum_{l=0}^{Z-1} \text{Im}\{f(m-l)f^*(m-D-l)\}$$

which equals $$z(m) = \frac{1}{h_2(m)}[\text{Re}\{\hat{f}(m)\}\text{Re}\{\sum_{l=0}^{Z-1} f(m-l)f^*(m-D-l)\} + \quad (0.28)$$

$$\text{Im}\{\hat{f}(m)\}\text{Im}\{\sum_{l=0}^{Z-1} f(m-l)f^*(m-D-l)\}$$

Again, using (0.9), we find $$z(m) = \frac{1}{h_2(m)}[\text{Re}\{\hat{f}(m)\}\text{Re}\{\hat{f}(m)\} + \text{Im}\{\hat{f}(m)\}\text{Im}\{\hat{f}(m)\}] \quad (0.29)$$

yielding $$z(m) = \frac{|\hat{f}(m)|^2}{h_2(m)} \quad (0.30)$$

The use of this in (0.25) yields (0.15).

I claim:

1. An apparatus for synchronization in a packet-based digital communication system that includes at least two communicating devices operating as a piconet, comprising:

an hierarchical cross-correlator (H-Xcorr) module to accept an input signal comprising an hierarchical synchronization sequence having a fixed length and to output a first correlated sequence therefrom; and a detector including a second stage auto-correlator module to receive the first correlated sequence and output $\hat{f}(m)$ as a second correlated sequence thereof delayed by the fixed length and determine from said second sequence if the input signal includes a valid preamble;

wherein the second stage auto-correlator module comprises a peak computation module to compute a peak of the second correlated sequence, the peak computation module being configured to compute a frequency error based on an angle of the peak of the second correlated sequence, and compute a peak of as the peak of $|\hat{f}(m)|^2$ the sum of the energy of the impulse response of a channel over a window Z, where Z is a number of samples not greater than a delay spread of the channel.

2. The apparatus of claim 1, wherein the input signal includes a time-domain sequence and a frequency domain sequence and the time domain sequence is the hierarchical synchronization sequence.

3. The apparatus of claim 2, wherein the hierarchical sequence is described by $$[a_0B, a_1B, \ldots, a_{15}B]$$

where B is an 8-length spreading sequence and $A = \{a_0, \ldots, a_{15}\}$ is an 16-length sequence and values of both sequences are unique for the piconet.

4. The apparatus of claim 3, wherein the detector is a minimum means squared error (MMSE) detector.

5. The apparatus of claim 4, wherein the H-Xcorr module comprises a de-spreading computation module to compute:
   an inner product that de-spreads the sequence B; and
   an outer sum that de-spreads the sequence A.

6. The apparatus of claim 1, wherein the peak computation module is further configured to use the second correlated sequence to evaluate a set of pre-determined conditions to identify false alarms from undesired close-by signals.

7. The apparatus of claim 6, further comprising first order low pass filters to pre-determine the set of conditions.

8. The apparatus of claim 1, wherein the peak computation module is further configured to:
   set a start of an FFT window for an OFDM-based modulation;
   use the real part of the peak for detection of a frame sync; and
   use the peak for burst detection purposes.

9. The apparatus of claim 8, wherein a modified maximum-likelihood (ML) decision rule is used on differentially demodulated data for detection of the frame sync.

10. The apparatus of claim 8, wherein for an MBOA proposal, the start of the FFT window is preferably set to $m_{peak} - Z - 128$.

11. The apparatus of claim 8, wherein a frequency error between the transmitter and receiver comprises a coarse frequency error and a fine frequency error that is respectively compensated by a coarse compensation and a fine compensation.

12. The apparatus of claim 11, further configured to include a digital mixer and a phase rotator, the coarse frequency error being compensated for using the digital mixer and the fine frequency error being compensated for using the phase rotator after FFT.

13. A method for synchronizing in a packet-based digital communication system that includes at least two communicating devices operating as a piconet, comprising:
   providing an hierarchical cross-correlator (H-Xcorr) computation module;
   accepting an input signal by the provided H-Xcorr, said input signal comprising an hierarchical synchronization sequence having a fixed length;
   outputting by the H-Xcorr a first correlated sequence computed from the accepted input signal;
   receiving the output first correlated sequence by a minimum mean squared error (MMSE) detector that includes a second stage auto-correlator computation module;
   computing by the second stage a second correlated sequence delayed by the fixed length; and
   determining by the detector from said second sequence if the input signal includes a valid preamble;
   wherein the second stage module is configured to:
   compute a peak of $\hat{f}(m)$ the second correlated sequence, said peak having a real part and said peak being used to determine if the input signal includes a valid preamble;
   compute a frequency error based on an angle of the peak of the second correlated sequence; and
   compute a peak of $|\hat{f}(m)|^2$ as the peak of the sum of the energy of the impulse response of a channel over a window Z, where Z is a number of samples not greater than a delay spread of the channel.

14. The method of claim 13, wherein:
the hierarchical sequence is described by $$[a_0B, a_1B, \ldots, a_{15}B]$$

where B is an 8-length spreading sequence and $A = \{a_0, \ldots, a_{15}\}$ is an 16-length sequence and values of both sequences are unique for the piconet; and
   the providing an H-Xcorr further comprises providing a de-spreading computation module therein to compute an inner product that de-spreads the sequence B and an outer sum that de-spreads the sequence A.

15. A system for synchronization in a packet-based digital communication system that includes at least two communicating devices operating as a piconet, comprising:
   an hierarchical cross-correlator (H-Xcorr) computation module that includes a de-spreading computation module to de-spread an input signal comprising an hierarchical synchronization sequence having a fixed length, and output a first correlated sequence computed from the de-spread input signal;
   a minimum mean squared error (MMSE) detector that includes—
   i. a second stage auto-correlator computation module that receives the first correlated sequence and computes a second correlated sequence delayed by the fixed length; and
   ii. a peak computation module to receive said second sequence and compute therefrom a peak of $\hat{f}(m)$ having a real part,
      a frequency error based on an angle of the peak of the second correlated sequence, and
      a peak of $|\hat{f}(m)|^2$ as the peak of the sum of the energy of the impulse response of a channel over a window Z, where Z is a number of samples not greater than a delay spread of the channel;
wherein, the detector uses the peak to set a start of an FFT window for an OFDM-based modulation, the real part of the peak for detection of a frame sync, and the peak for burst detection.

* * * * *